Sept. 6, 1955  I. SIHLER ET AL  2,717,287
SWITCHING APPARATUS FOR ELECTRIC POWER TRANSMISSIONS
Filed June 15, 1951  6 Sheets-Sheet 1

Inventors:
Immanuel Sihler, deceased, by
Emilie Luise Sihler, Executrix
Joseph Biersack
By C. M. Avery
Attorney Sept. 6, 1955      I. SIHLER ET AL      2,717,287
SWITCHING APPARATUS FOR ELECTRIC POWER TRANSMISSIONS
Filed June 15, 1951      6 Sheets-Sheet 3
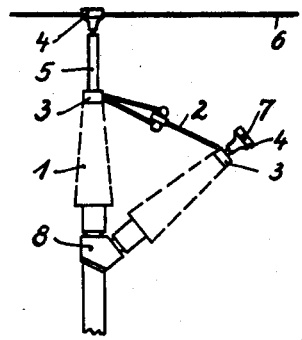
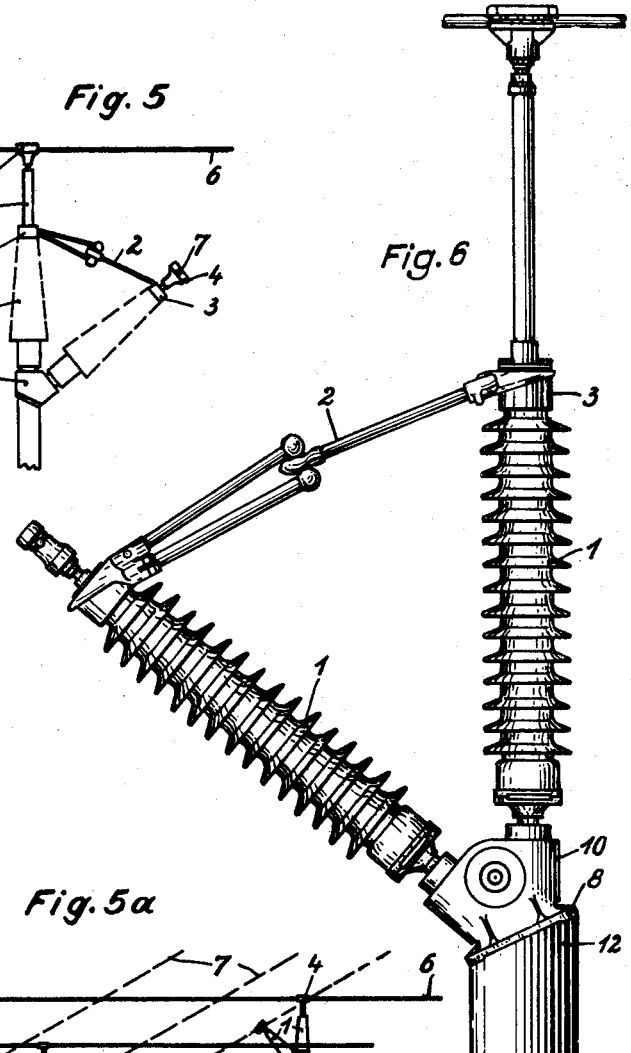
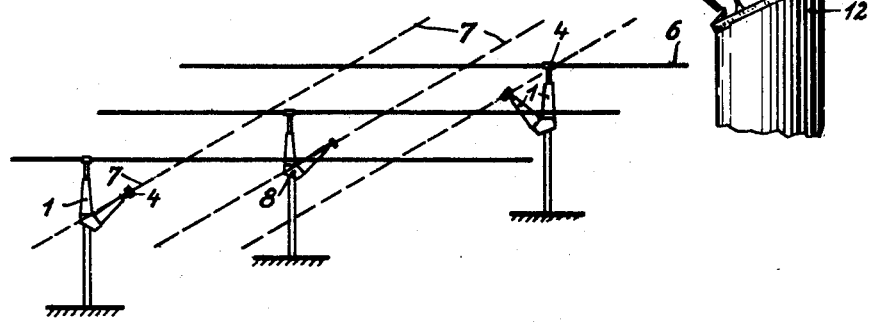

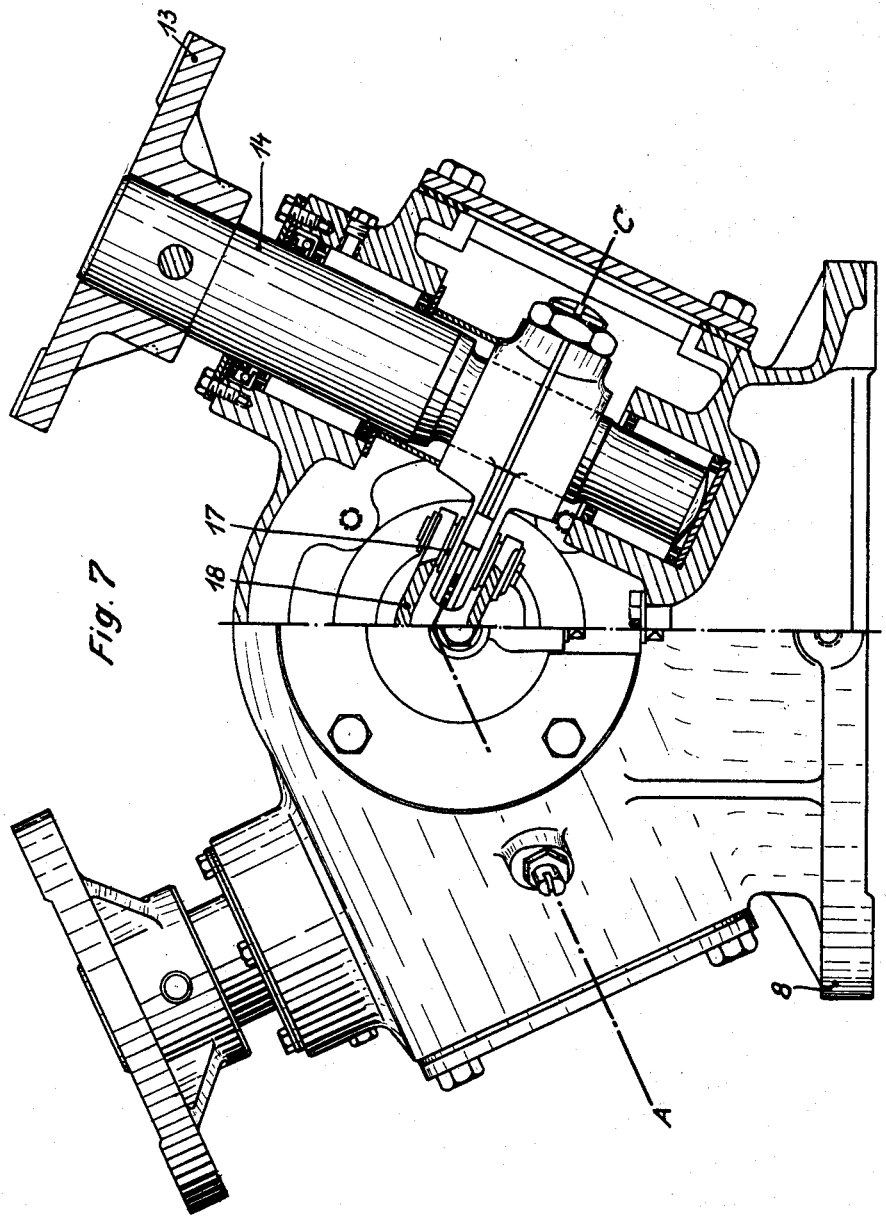

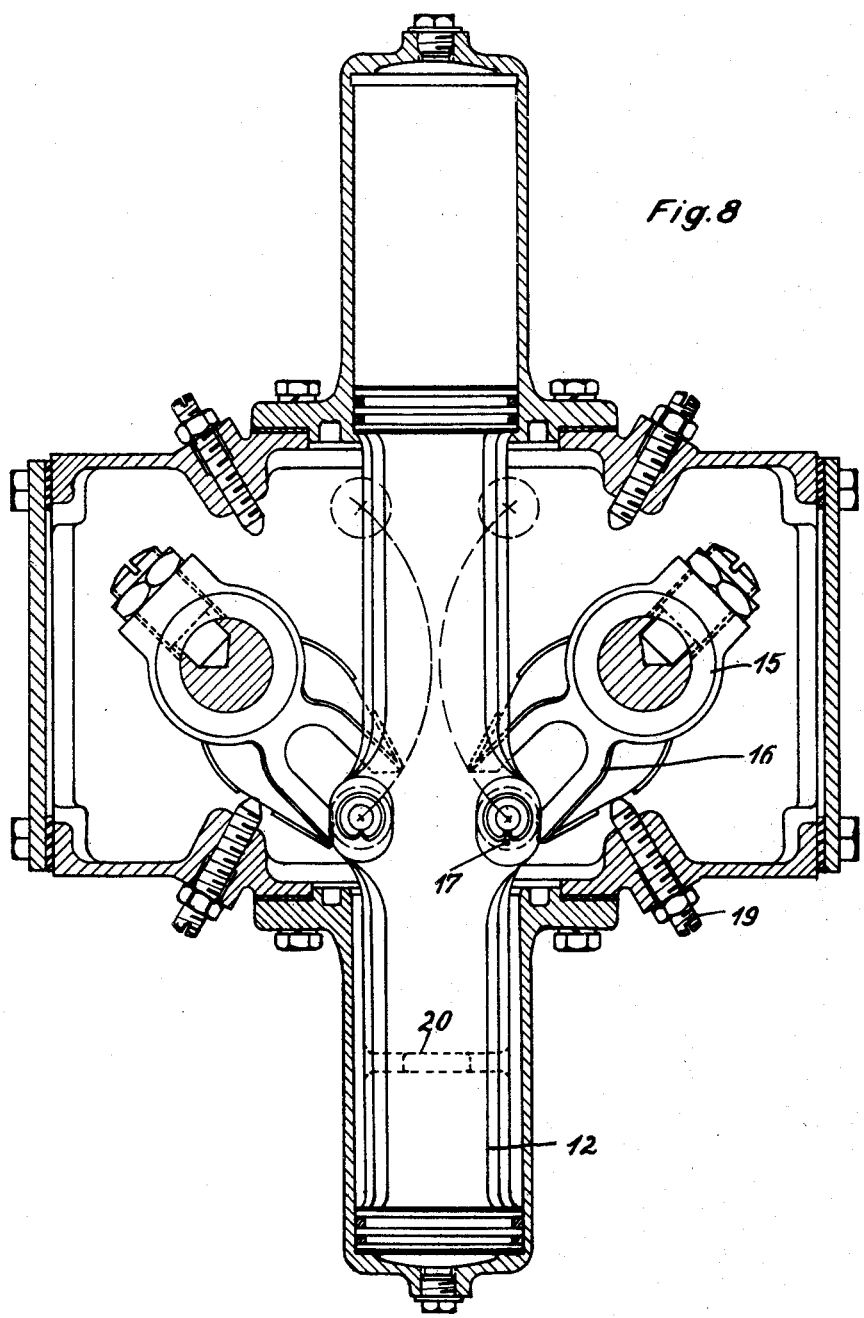

Sept. 6, 1955     I. SIHLER ET AL     2,717,287
SWITCHING APPARATUS FOR ELECTRIC POWER TRANSMISSIONS
Filed June 15, 1951     6 Sheets-Sheet 6
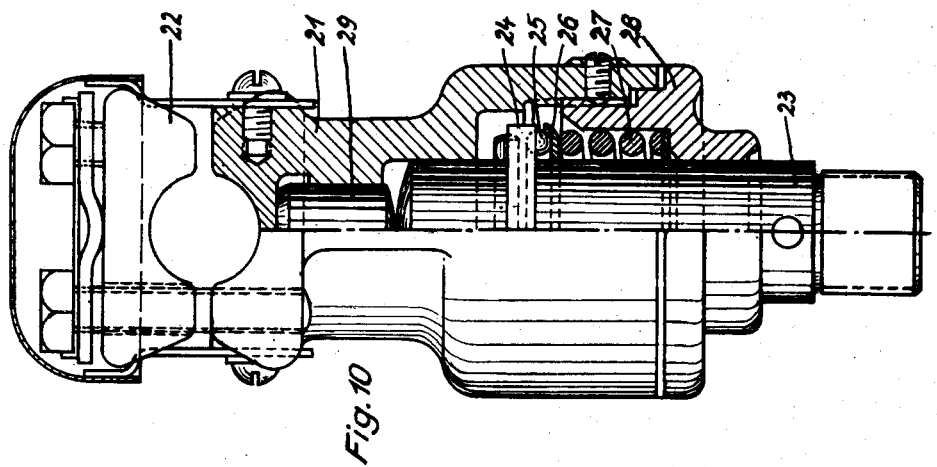
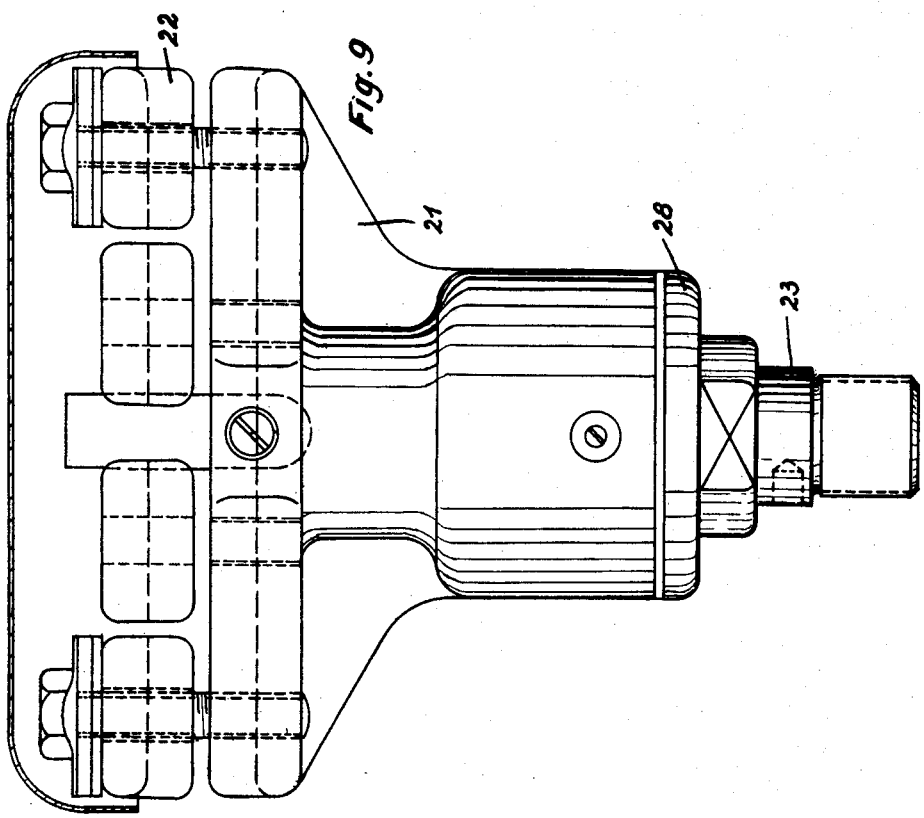
Inventors:
Immanuel Sihler, deceased, by
Emilie Luise Sihler, Executrix
Joseph Biersack
By C. M. Avery
Attorney

United States Patent Office 2,717,287
Patented Sept. 6, 1955

2,717,287

SWITCHING APPARATUS FOR ELECTRIC POWER TRANSMISSIONS

Immanuel Sihler, deceased, late of Hamburg, Germany, by Emilie Luise Sihler, née Orlowsky, executrix, Hamburg, and Joseph Biersack, Berlin-Siemensstadt, Germany, assignors to Siemens-Schuckertwerke Aktiengesellschaft, Berlin-Siemensstadt, Germany, a corporation of Germany Application June 15, 1951, Serial No. 231,686
In Germany October 1, 1948

Section 1, Public Law 690, August 8, 1946
Patent expires October 1, 1968

14 Claims. (Cl. 200—48)

The invention relates to substation equipment for electric power transmission lines, and particularly to switch gear and line suspension means applicable in substations, preferably those of the outdoor type.

The two conductor systems of a power line substation, namely, the transmission or feeder lines (mains) and the branch or tap lines (buses) are usually located in different planes or vertical strata and cross each other preferably at right angles. In known installations, the feeder mains as well as the branch buses are mechanically clamped off by separate suspension structures, and the switch gear is joined with the two conductor systems by mechanically relieved connecting leads, the mains being disposed either above or below the buses. To save supporting structure, it has also become known to provide a clamp-off suspension only for the mains and to have the branch buses directly held by the insulating pillars or supports of the disconnect switches, or vice versa. A further step toward simplification has been done in conjunction with tubular conductors by supporting these conductors by holders attached to the electric terminal members of the disconnect switches. In installations with three-phase feeder mains and serially aligned two-pillar type disconnect switches, the just-mentioned holders consist of a vertical holding piece for the middle main and of an arcuate holding piece for each of the two outer mains, while only vertical holding pieces are used in a staggered-type system build-up. The terminal members on which these holding pieces are mounted, are revolvably secured to the movable switch armature so that the holding pieces remain at rest when the switch supports are turned for opening and closing the disconnect switch. Because of the required spacing between feeders and branches, the height of such a holding piece is at least equal to the spacing between the terminal members of the disconnect switch. Hence, a high bending strain is imposed upon the terminal members. To reduce this strain, a third support (auxiliary support or pillar) for the switch has been provided. This third support either acts jointly with the terminal member of the disconnect switch to brace the arcuate holding pieces or is rigidly connected with the switch terminal member that carries the vertical holding piece.

Referring to switching stations of the above-mentioned general type with main and branch conductor systems extending crosswise in different strata or planes, it is an object of the invention to simplify the design of the required apparatus and to reduce the strain on the switch terminal members as compared with the known switching station equipment.

To this end, and in accordance with a feature of the invention, the terminal members of the disconnect switches for such a station are disposed in the different strata of the respective conductor systems and form the mechanical suspension means for the system conductors. As a result, the suspension attachment of the conductors is mechanically improved to such an extent that, under otherwise comparable conditions, the strain imposed upon the switch terminals is very much smaller than in the known apparatus, therefore special auxiliary switch supports or pillars are no longer required. While in the known design, having the switch terminals located in a common plane, the mains are joined with the switch terminals through respective holding pieces, a station design according to the invention may be looked upon as bringing the switch terminals up or down directly to the points where the suspension connections with the mains and buses are needed. Therefore, even if apparatus according to the invention may be equipped with an additional connecting piece between a switch terminal and the pertaining switch pillar, this piece forms part of the disconnect switch, i. e., it carries the terminal member at its end point where the pertaining conductor is attached so that the connecting piece does not exert or transmit applicable strain upon the terminal, in favorable contrast to the strain transmission effective in the terminal-clamp connections of the known apparatus.

According to another feature of the invention, the terminal members in the two respective strata or planes are preferably disposed in mutually displaced relation. That is, the spacing between them is larger than the shortest distance between the two strata or planes of the respective conductor systems. This affords an increased freedom of disposition as regards the arrangement of the main and branch conductors.

The foregoing and other objects and features of the invention will be apparent from the embodiments illustrated on the drawings, in which Fig. 1 is a schematic side view of a single-pole disconnect switching apparatus according to the invention, and Fig. 1a shows a schematic perspective view of a three-phase station equipped with apparatus of the same design;

Figs. 3 and 3a show similarly a third embodiment of switching apparatus and three-phase station respectively, while Figs. 4, 4a and Figs. 5, 5a are corresponding pairs of illustrations of a fourth and a fifth embodiment respectively;

Fig. 6 is a more detailed side view of a somewhat modified apparatus generally similar to the one schematically represented in Fig. 5; Fig. 7 is a part-sectional side view of the base portion of the apparatus of Fig. 6, and Fig. 8 is a sectional top view of the same base portion along the planes denoted by VIII—VIII in Fig. 7;

Figs. 9 and 10 are a side view and a part-sectional front view of a switch terminal structure applicable as part of apparatus according to any of the other figures.

Figure 1:
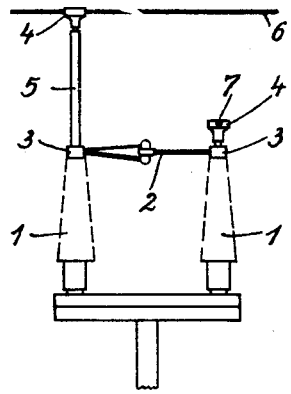

Referring to Fig. 1, the illustrated apparatus is to some extent comparable with a conventional two-pillar type disconnect switch but is modified in accordance with the invention. The switch has two insulating supports or pillars 1 and 1'. The mutually engageable switch contact members 2 and 2' are firmly joined with the top fixtures (armatures) 3 and 3' of the respective supports so that the switch is opened or closed when the supports 1 and 1' are rotated. The electric terminal member 4' of support 1' is revolvable relative thereto and carries the branch bus 7. The terminal member 4 of support 1 is located in the plane of the main conductor 6 which extends above the plane of the branch bus. To provide for the necessary spacing, the terminal member 4 is connected with the armature 3 of support 1 by means of a conductive and rod-shaped connecting piece 5 on whose upper end the terminal member 4 is revolvably mounted. The terminal member 4 supports the feeder main 6 which may be designed as a tubular or stranded conductor. In comparison with the above-mentioned known design in which a holding piece has its lower end connected with a switch terminal member revolvably secured to the armature, the device according to the invention requires that the connecting piece 5 be rigidly joined with the armature 3 and that the terminal member 4 be revolvably mounted at the upper end of the connecting piece to be located directly in the plane or stratum of the feeder mains. In this manner the mechanical strain upon the electric switch terminal is greatly reduced so that a bracing of the connecting piece 5 or a third switch pillar can be dispensed with. In other words, it is essential for the invention that the terminal members 4 themselves be located in the same respective planes as the crosswise extending conductor systems. In the embodiment of Fig. 1, the terminal members are mutually displaced in these two planes so that no difficulties are encountered in placing the feeder mains and branch buses at right angles to each other.

Figure 1A:
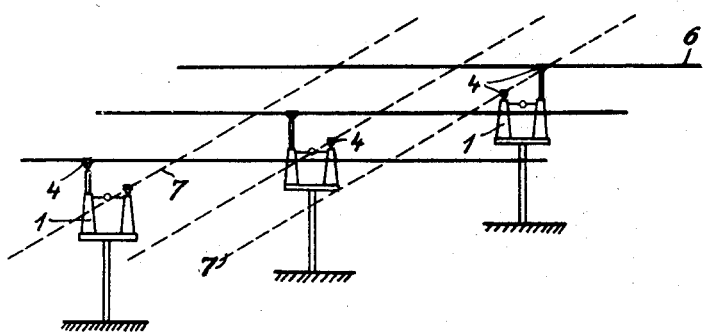

As mentioned, Fig. 1a shows a three-phase system comprising three apparatus units according to Fig. 1. The three units are installed in staggered relation. The branch buses 7 are distinguished by broken-line illustration from the mains 6.

Figure 2:
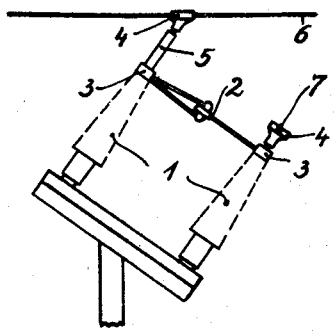
Fig. 2 is a schematic view of another embodiment and Fig. 2a shows a corresponding three-phase station in schematic perspective.

In the embodiment according to Fig. 2 a two-pillar type disconnecting switch has a slanting base so that the two pillars 1, 1' extend also in a slanted direction. The individual elements of this switching station are denoted by the same reference characters as the corresponding elements in Fig. 1. In order to have the two terminal members 4 and 4' extend in the respective planes of the feeder mains 6 and the branch buses 7, the holding piece 5 is connected with the armature 3 of one pillar, and the appertaining terminal 4 is revolvably mounted on the holding piece. This terminal member supports the main conductor 6 while the branch bus 7 is secured to the terminal member 4' of the other switch pillar. The holding piece 5 can be eliminated by correspondingly slanting the switch or/and a corresponding dimensioning of the pillar spacing.

Figure 2A:
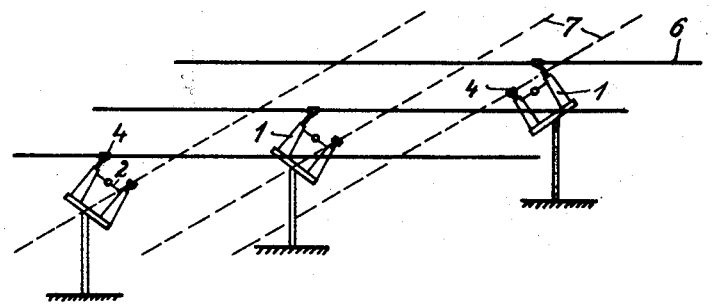

Fig. 2a, showing a three-phase system composed of apparatus units according to Fig. 2, is similar to Fig. 1a in indicating a preferred, staggered arrangement of the three units.

Figure 3:
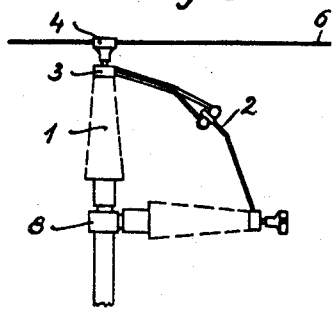
Figure 3A:
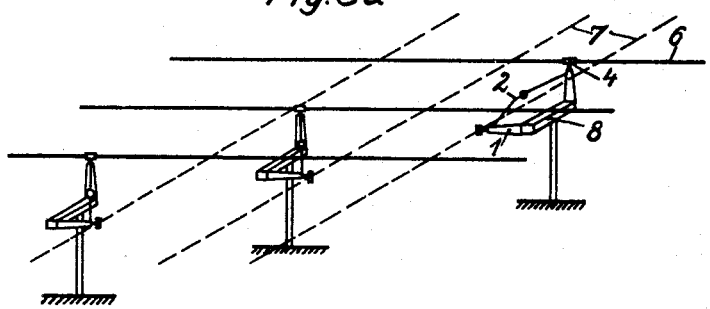

In the unit according to Fig. 3, a disconnect switch is provided whose supports or pillars 1 and 1' have respective axes intersecting each other at a right angle. The two pillars are firmly secured to a switch base plate 8. The two terminal members 4 of this unit are thus placed into the respective planes of the main conductor 6 and the branch conductor 7, these conductors being supported by the respective terminal members. The three-phase arrangement of Fig. 3 has mains, branches and disconnect switching apparatus designed in accordance with Fig. 3, the three apparatus units being again arranged in mutually displaced relation.

An especially favorable design of a disconnect switch is obtained if the axis of the switch pillars, as customary, are located in a common plane but, in contrast to the conventional design, are slanted toward each other. This is especially favorable with a two-pillar switch, particularly if the two pillar axes intersect in or near the base plate of the switch. Such an angular arrangement of the pillar axes has the effect that the armatures or top fixtures of the insulating switch supports already occupy different planes which can readily be made to coincide with the respective planes of the crosswise extending conductor systems; or one of the pillars need only be equipped with a relatively short connecting rod whose upper end carries the switch terminal. Another essential advantage of mutually inclined switch pillar axes lies in the fact that the over-all space requirements of the disconnect switch become smaller than with a parallel arrangement of the pillar axes. Particularly the size of the switch base plate can be considerably reduced. Apparatus embodying the just mentioned features will be described presently.

Figure 4:
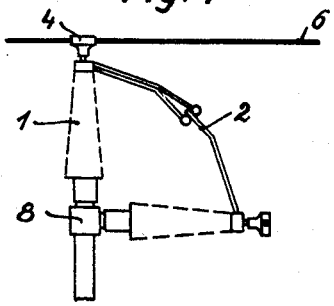
Figure 4A:
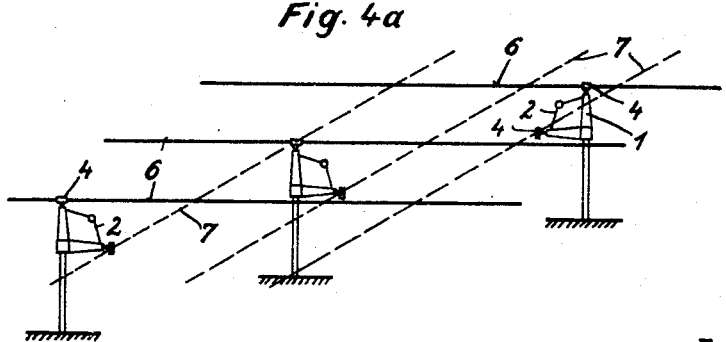

In the switch apparatus according to Fig. 4, the two supports 1 and 1' are perpendicular to each other. The main conductor 6 is supported by the terminal member 4 of the vertical switch support 1. The branch conductor 7 is secured to the terminal member 4' of the horizontal support 1'. As apparent from this illustration, the switch base plate or frame structure 8 is considerably smaller than in the apparatus previously described. This has also the advantage that for supporting the base plate 8 a simple pole can be used rather than the table type structure used in known switches with parallel pillars.

Instead of having the axes of the two supports extend at a right angle to each other, the angle of inclination can be reduced by maintaining the position of the one pillar that extends perpendicular to the plane of the system conductors and turning the other support out of this plane so that the two pillar axes form an angle smaller than 90 degrees. This permits reducing the height of the supporting structure or supporting rod for the disconnect switch below the height required when the pillar axes intersect at a right angle. Such a reduction in height is possible because part of the insulating distance from ground, of the conductor carried by the terminal member of the inclined pillar, is determined by the height of this terminal member above the horizontal plane. The angle between the axes of the two supporting pillars can be chosen so that the two terminal members can be mounted directly on the respective pillar armatures. However, the angle may also be kept somewhat smaller in order to reduce the height of the supporting structure for the disconnect switch. The latter case requires mounting on the armature of one pillar a connecting piece to carry the terminal member. It has been found that an angle of approximately 50 degrees results in optimum conditions, i. e., the required connecting piece does not become unduly long and the reduction in height of the supporting rod for the switch unit is large. Besides, the necessary over-all space requirements are a minimum. This will be recognized from the embodiment shown in Fig. 5.

In the switch apparatus according to Figs. 5 and 5a, the respective axes of the two supporting pillars 1 and 1' intersect at an angle of approximately 50 degrees. In order to place the terminal member 4 of the vertical pillar 1 into the plane of the main conductor 6, this terminal member is revolvably mounted on a connecting rod 5 firmly secured to the armature 3. As is apparent, the space requirements of such an angular switch are considerably smaller than that of the known disconnect switches with parallel supporting pillars.

According to the more detailed illustration of such an angular disconnector shown in Fig. 6, the two insulating pillars 1 are mounted on a housing 10 whose base plate 8 is supported by a carrier structure or pole 12. The movable terminal member 4' of pillar 1' carries the branch bus 7. The terminal member 4 for the main conductor 6 is revolvably mounted on a rod 5 which is firmly joined with the top fixture 3 of pillar 1. The housing 10 accommodates the driving means for revolving the pillars 1 and 1' to open and close the switch.

The two pillars are controlled by compressed air. As apparent from Figures 7 and 8, a twin piston 12 is provided. Each supporting pillar 1 or 1' is mounted on a flange 13 firmly secured to a shaft 14. Each shaft 14 carries a crank arm 15 which has a bifurcated portion 16 in engagement with a roller 17. Roller 17 is journalled between two arms 18 of a bridge which connects the two pistons 12 with each other. The axis of each roller 17 is parallel to the revolving axis of the pertaining shaft 14. If a compressive medium, for instance air, is forced into the space in front of the front piston, the piston is displaced backwards, and each roller 17, acting through the bifurcated crank 16, turns the pertaining shaft 14 with the switch pillar. If compressed air is admitted to the rear piston, the piston moves forward and the shaft resumes the illustrated position upon completion of the piston movement. As will be seen from Fig. 8, the bifurcated portion of each crank 16 is shaped so that its edge runs tangential to the adjacent roller 17 at the end of the lifting movement, so that when the piston is at rest, a return movement of the crank is prevented. A small stop screw 19 is provided for stopping and properly positioning the shaft in the opposite direction. The lower arm 18 has cross ribs 20 to permit moving the switch blades by means of a lever in the event of pressure failure. The drive housing 12 has a base plate 8 screwed to the supporting pole of the unit.

Figures 9 and 10 show a terminal structure applicable with switch units according to the invention. In the illustrated example, a terminal housing 21 is provided. The conductor to be clamped is placed into the upper part of the housing and is firmly secured by means of a clamp cover 22. The terminal housing 21 is revolvable about a journal pin 23 screwed into the end fixture of the supporting pillar and secured in position by a dowel screw or pin. The pin 23 carries a bearing plate 24 which forms a raceway for bearing balls 25. These balls are in contact with a movable raceway plate 26 subjected to the force of a compression spring 27. The lower end of spring 27 bears against a flanged part 28 which is screwed together with the housing 21. Thus the whole housing structure is forced downwardly by the spring 27. This keeps a contact plug 29 in pressure engagement with the journal pin 23. Plug 29 is firmly seated in the terminal housing. As apparent from the illustration, pin 23 and consequently the supporting pillar to which it is rigidly secured can be rotated relative to the terminal housing 21 without affecting the passage of current from the journal pin to the conductor firmly clamped in the terminal housing.

All above described embodiments, of course, can readily be modified so that the mains are located below the branch buses of the system.

It will be recognized that in units according to the invention the lower plane or stratum of conductors intersects certain parts of the switch apparatus. For instance, in the units according to Figs. 1 and 5, the lower plane in which the bus conductors 7 are located intersects the vertical connecting rod 5. In units according to Figs. 2, 3 and 4 the lower conductor plane intersects the base plate 8 of the switch unit. Therefore, the conductors of the lower stratum are preferably so directed that they run perpendicularly to the plane of the supporting pillars (Figs. 1, 5) or parallel to the base plane (Fig. 3). In the upper conductor stratum which does not intersect any part of the supporting pillars, complete freedom of disposition relative to the arrangement of the conductors is available. Preferably, however, the conductors in the upper stratum are so directed that they extend substantially perpendicularly to the conductors of the lower stratum.

We claim:

1. Switching apparatus for power-line substations with stratified and crossing conductor systems, comprising a disconnect switch having two insulating support pillars spaced from each other, said pillars having mutually engageable switch contact members respectively and being revolvable about their respective axes for moving said members between switch-closing and opening positions, respective switch terminal members each forming a through-conductor clamp and having a pivot adjacent to said clamp, said terminal members having said pivots joined with said respective pillars so as to be revolvable relative thereto, said terminal members being disposed in different strata corresponding to the conductor strata and forming intermediate supporting means for the respective system conductors.

2. Switching apparatus for power-line substations with stratified and crossing conductor systems, comprising a disconnect switch having a base and having two mutually spaced insulator pillars mounted on said base, said pillars having mutually engageable switch contact members respectively and being revolvable about their respective axes for moving said members between switch-closing and opening positions, respective switch terminal members mounted on top of said respective pillars and being coaxially revolvable relative to said respective pillars, said terminal members being horizontally spaced from each other at respectively different heights above said base, and having through-conductor holding means for supporting the respective system conductors at points intermediate the ends thereof.

3. Switching apparatus for power-line substations with stratified and crossing conductor systems, comprising a disconnect switch having a base and having two mutually spaced insulator pillars mounted on said base, said pillars having mutually engageable switch contact members respectively and being revolvable about their respective axes for moving said members between switch-closing and opening positions, a conductive part rigidly mounted on top of each of said pillars and conductively connected with the pertaining one of said contact members, a terminal structure revolvably mounted on each of said conductive parts to be capable of remaining stationary during revolution of said pillars, said two terminal structures of said respective pillars having respectively different heights above said base and having each a through-conductor clamping means for supporting one of the respective system conductors at a point intermediate its ends.

4. In switching apparatus according to claim 3, said two insulator pillars extending parallel to each other and being horizontally spaced from each other relative to said base.

5. In switching apparatus according to claim 3, said base having a slanting top, said two pillars extending upwardly from said top in parallel relation to each other and perpendicularly to said top.

6. In switching apparatus according to claim 3, one of said two pillars having an elongated conductive connecting piece interposed between said part and said pertaining terminal structure, said connecting piece extending coaxially to said one pillar and forming an upward extension thereof.

7. Switching apparatus, comprising a disconnect switch having a base and having two insulating columnar supports mounted on said base and equipped with respective mutually engageable switch members, said supports having respective axes inclined to each other in a common plane and being revolvable relative to said support to mutually engage and disengage said respective switch members, and two switch terminal structures mounted on top of said respective supports in mutually different vertical planes and electrically connected with said respective switch members, said terminal structures being coaxially revolvable relative to said respective supports and comprising through-conductor clamps for supporting electrical conductors in mutually different vertical planes.

8. In switching apparatus according to claim 7, said support axes intersecting each other at an angle of substantially 90 degrees.

9. In switching apparatus according to claim 1, said disconnect switch having a base, said supports being mounted on said base in V-shape and having respective axes intersecting each other at an acute angle.

10. In switching apparatus according to claim 7, said axes of said respective supports intersecting each other at an angle of substantially 50 degrees.

11. Switching apparatus according to claim 7, comprising two shafts journalled in said base, said two supports being joined with said respective shafts to revolve together therewith, and a drive common to said two shafts for revolving them simultaneously.

12. Switching apparatus according to claim 7, comprising two shafts journalled in said base, said two supports being joined with said respective shafts to revolve together therewith, a pressure-air piston drive disposed on said base, and transmission means connecting said drive with said two shafts.

13. Switching apparatus for joining two vertically stratified and mutually crossing conductor systems, comprising a disconnect switch having a two-pressure-responsive actuating means having respective pistons and having a rigid bridge structure inter-connecting said two pistons, two rollers revolvably mounted on said bridge structure, and two bifurcated arms firmly secured to respective shafts and in straddling engagement with said respective rollers.

14. Switching apparatus according to claim 7, comprising two shafts journalled in said base, said two supports being joined with said respective shafts to revolve together therewith, and a drive connected with said shafts for revolving them simultaneously, said base forming a housing and frame of said drive so that said base and said drive are a structural unit.

References Cited in the file of this patent

UNITED STATES PATENTS

| | | |
|---|---|---|
| 1,815,392 | Alsaker | July 21, 1931 |
| 2,510,051 | De Montmollin et al. | June 6, 1950 |

FOREIGN PATENTS

| | | |
|---|---|---|
| 693,808 | Germany | July 19, 1940 |
| 920,855 | France | Apr. 21, 1947 |